United States Patent [19]
Kim

[11] Patent Number: 5,917,781
[45] Date of Patent: *Jun. 29, 1999

[54] APPARATUS AND METHOD FOR SIMULTANEOUSLY REPRODUCING AUDIO SIGNALS FOR MULTIPLE CHANNELS

[75] Inventor: Young Chul Kim, Seoul, Rep. of Korea

[73] Assignee: LG Electronics, Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/880,168

[22] Filed: Jun. 20, 1997

[30] Foreign Application Priority Data

Jun. 22, 1996 [KR] Rep. of Korea ...................... 96-23093

[51] Int. Cl.$^6$ ................................. H04B 1/20; H04N 5/91
[52] U.S. Cl. ................................... 369/4; 369/33; 386/97
[58] Field of Search .................... 369/4, 32, 33, 369/58, 5, 3; 386/96, 97, 98, 99, 126, 105, 104, 106

[56] References Cited

U.S. PATENT DOCUMENTS

| | | | |
|---|---|---|---|
| 5,646,931 | 7/1997 | Tarasaki | 369/124 |
| 5,652,824 | 7/1997 | Hirayama et al. | 386/95 |
| 5,691,972 | 11/1997 | Tsuga et al. | 369/275.3 |

OTHER PUBLICATIONS

Sound Quality, Panasonic DVD Players, 1996.

*Primary Examiner*—Tan Dinh

[57] ABSTRACT

A reproducing method and apparatus include an audio signal processor, a controller, and at least one decoder. The audio signal processor receives digital audio signals for more than one channel reproduced from a disc, and processes the received digital audio signals. The controller sets at least a first channel for reproduction, and generates a first control signal indicative thereof. The first decoder receives the processed audio signals and the first control signal, and extracts and decodes audio signals for the first channel included in the processed audio signals based on the first control signal.

29 Claims, 8 Drawing Sheets

FIG 3

| AUDIO CHANNEL (LANGUAGE) SELECTION |
|---|
| Audio 1 (English) ; CH1 |
| Audio 2 (German) ; CH2 |
| Audio 3 (Japanese) ; CH3 |
| . |
| . |
| . |
| select ; ΛV       set ; OK |

FIG 7

| AUDIO CHANNEL (LANGUAGE) MIXING SELECTION |
|---|
| Audio 1 ; CH1<br>Audio 2 ; CH2<br>Audio 3 ; CH3<br>.<br>.<br>.<br>Audio n ; off<br>select ; ∧V   set ; OK |

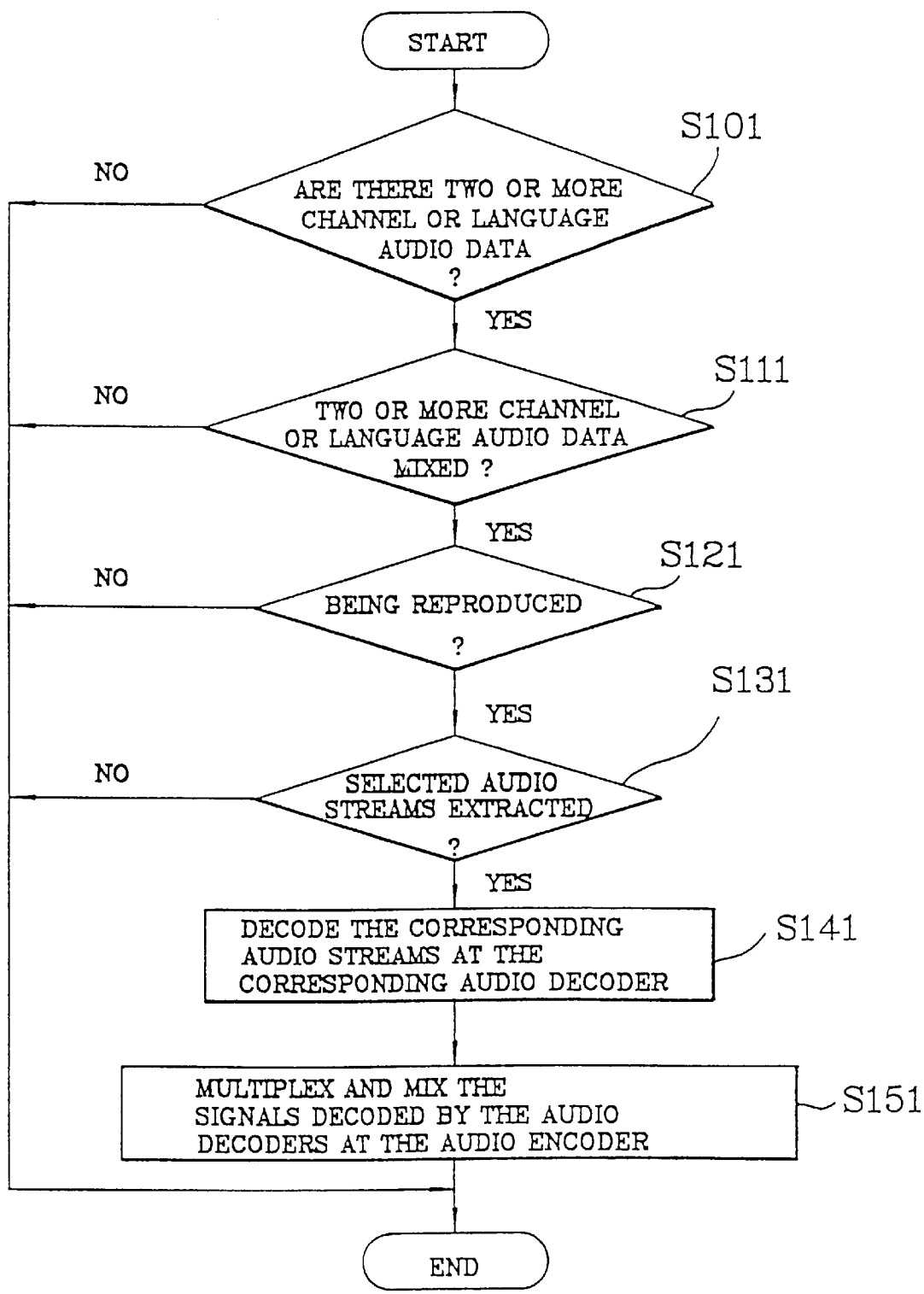

APPARATUS AND METHOD FOR SIMULTANEOUSLY REPRODUCING AUDIO SIGNALS FOR MULTIPLE CHANNELS

BACKGROUND OF THE INVENTION

I. Field of the Invention

The present invention relates to an apparatus for reproducing signals from a disc; and more particularly, relates to an apparatus for simultaneously reproducing audio signals for multiple channels or multiple languages from a DVD (Digital Versatile Disc or Digital Video Disc) and a method therefor.

II. Description of the Related Art

FIG. 1 illustrates a block diagram of a conventional apparatus for reproducing audio signals from a DVD. As shown in FIG. 1, the conventional reproducing apparatus includes a pickup 102 detecting audio signals recorded on a disc 101 such as a DVD, a high frequency (HF) processor 103 processing the signals detected by the pickup 102 and outputting the processed HF signals; an audio decoder 104 decoding the processed HF signals and outputting the decoded audio signals; and a controller 105 controlling the operation of the audio decoder 104 and the HF processor 103.

The operation of the conventional reproducing apparatus is as follows. The pickup 102 detects data recorded in the DVD. The HF processor 103 processes the detected signals of the pickup 102 under the control of the controller 105, and outputs the processed HF signals. At this point, the audio decoder 104 receives the processed HF signals, decodes the processed HF signals under the control of the controller 105, and outputs the decoded audio signals. The output of the audio decoder 104 can then be heard through speakers or headphones.

A problem with the conventional apparatus is that it reproduces and outputs audio signals for only one channel or language from among multiple channels or languages recorded in the DVD.

SUMMARY OF THE INVENTION

An object of the present invention is to provide an apparatus and method for reproducing audio signals for a plurality of channels or languages from a disc which simultaneously outputs audio signals for a plurality of selected channels or languages recorded on the disc.

Another object of the present invention is to provide an apparatus for reproducing audio signals for a plurality of channels or languages from a disc which simultaneously decodes audio signals for a plurality of channels or languages recorded on the disc.

A further object of the present invention is to provide an apparatus and method for reproducing audio signals for a plurality of channels or languages from a disc which simultaneously decodes audio signals for a plurality of selected channels or languages recorded on the disc, mixes the selectively decoded audio signals, selects audio signals for desired channels or languages from among the mixed audio signals and outputs the selected audio signals.

These and other objects are achieved by providing an audio signal processor receiving digital audio signals for more than one channel reproduced from a disc, and processing said received digital audio signals; a controller setting at least a first channel for reproduction, and generating a first control signal indicative thereof; at least a first decoder receiving said processed audio signals and said first control signal, and extracting and decoding audio signals for said first channel included in said processed audio signals based on said first control signal.

These and other objects are also achieved by providing (a) receiving digital audio signals for more than one channel reproduced from a disc; (b) processing said received digital audio signals; (c) setting at least one channel for reproduction; (d) extracting audio signals for said channel set in said step (c) from said processed audio signals; and (e) decoding said extracted audio signals.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 3 shows an example of an audio channel selection menu used in the reproducing apparatus of FIG. 2;

FIG. 7 is an example of an audio channel selection menu used in the reproducing apparatus of FIG. 6; and FIG. 8 is a flow chart of the operation of the reproducing apparatus of FIG. 6.

DESCRIPTION OF THE INVENTION

Figure 1:
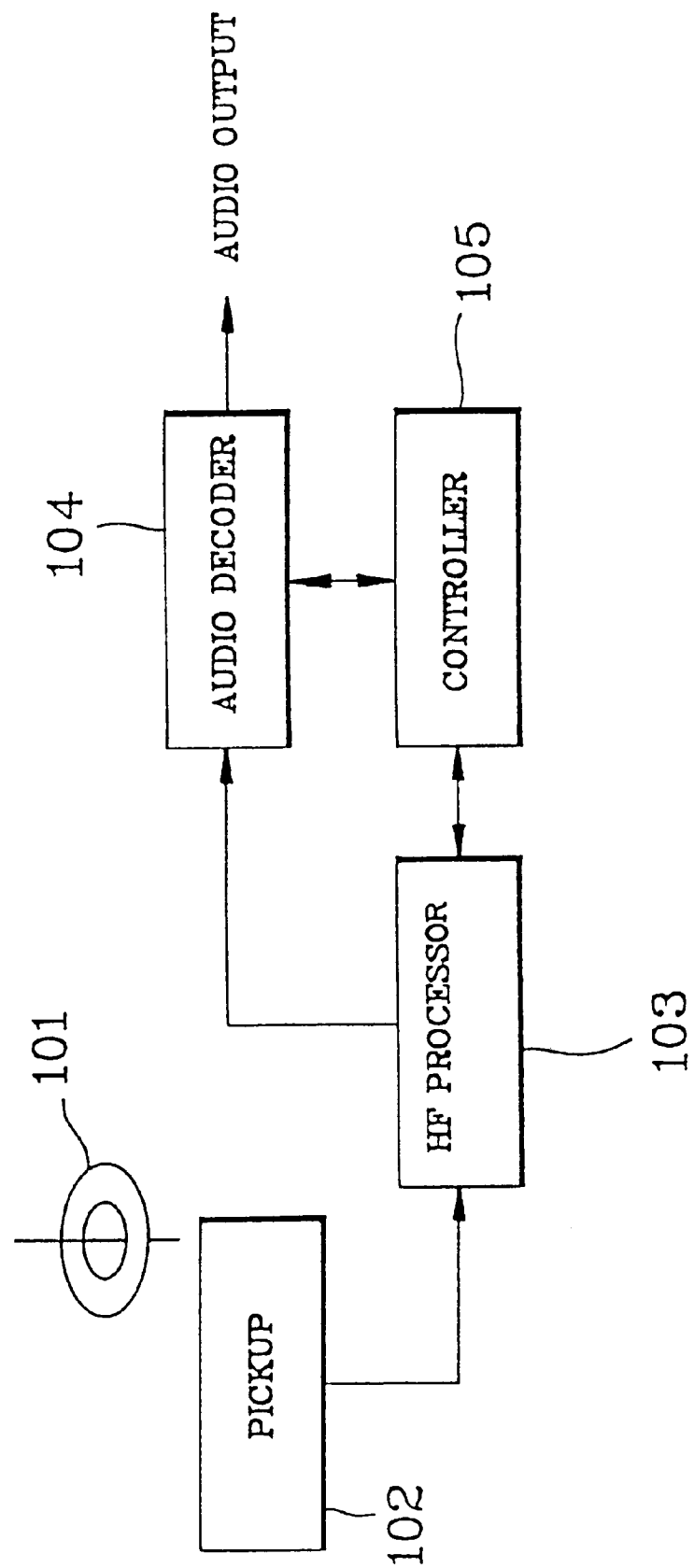
FIG. 1 is a block diagram of a conventional apparatus for reproducing audio signals from a DVD.
Figure 2:
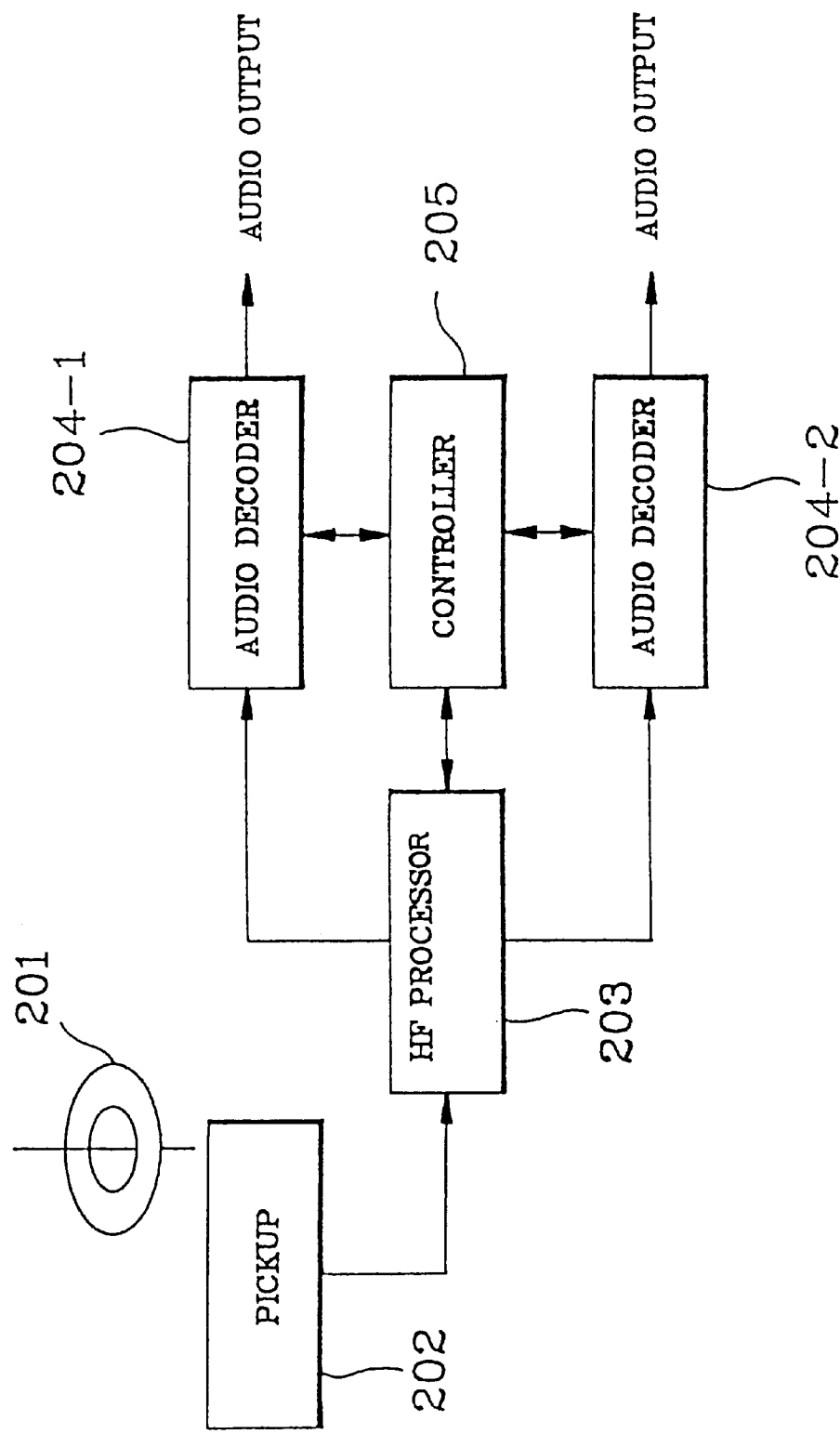
FIG. 2 is a block diagram illustrating an apparatus for reproducing audio signals from a DVD according to a first embodiment of the present invention.

FIG. 2 is a block diagram of an apparatus for reproducing audio signals for a plurality of channels or languages from a DVD according to a first embodiment of the present invention. As shown, the reproducing apparatus includes a pickup 202 detecting multiple audio signals recorded on a disc 201, such as a DVD; a high frequency (HF) processor 203 processing the audio signals detected by the pickup 202 and outputting the processed HF signals; first and second audio decoders 204-1 and 204-2 which decode the processed HF signals and output respective first and second decoded audio signals; and a controller 205 controlling the HF processor 203 and the first and second audio decoders 204-1 and 204-2 based on key or user input.

Figure 4:
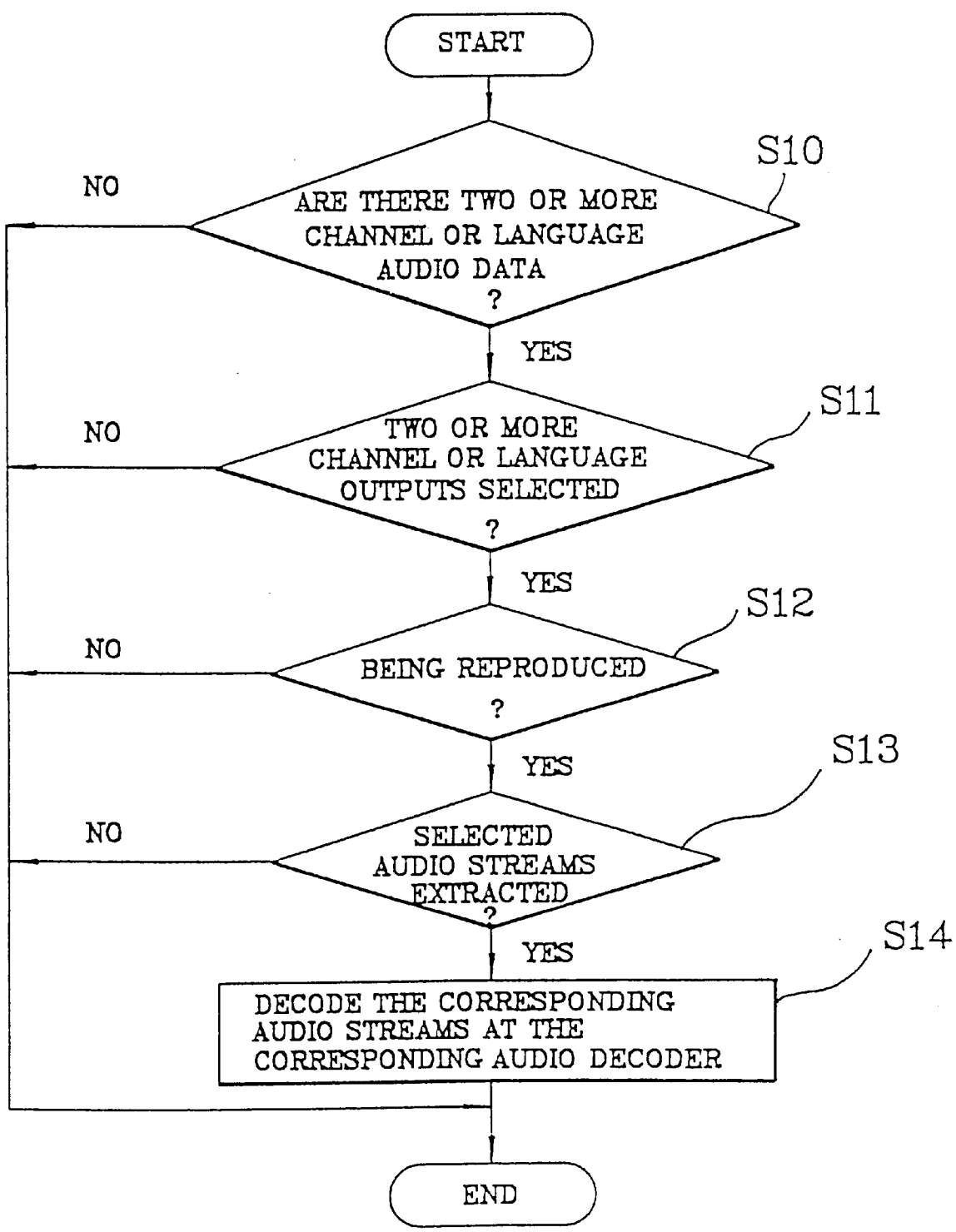
FIG. 4 is a flow chart of the operation of the reproducing apparatus of FIG. 2.

The operation of the reproducing apparatus shown in FIG. 2 will be described with reference to FIG. 4. FIG. 4 illustrates a flow chart of the operation of the reproducing apparatus shown in FIG. 2. First, if the disc 201 is loaded, the pickup 202 detects guide information recorded in the header of the disc. Then the HF processor 203 processes the guide information, and transfers the processed information to the controller 205. The controller 205 determines in Step S10 whether or not the transferred information is related to audio data for multiple channels or languages.

If the transferred information relates to audio data for multiple channels or languages, the controller 205 causes this information to be displayed on display devices (not shown), such as digitrons and on-screen displayers, as a selection menu of audio channels. An example display of such a selection menu is shown in FIG. 3. For example, the selections include Audio 1 (English), Audio 2 (German), Audio 3 (Japanese), etc. If the disc 201 does include audio data related to multiple channels or languages, processing ends.

Next, users push selection keys to select one of the channels or languages from among the multiple audio channels or languages displayed. The number of channels or languages selected is limited to the number of decoders in the reproducing apparatus. The users then push the set key to set the selections made. For example, a first user enters Audio 1 (English) or channel CH1 and a second user enters Audio 3 (Japanese) or channel CH3.

At step S11, the controller 205 receives the user input (not shown) and judges whether two or more channels or languages have been selected. If two or more channels have been selected, the controller 205 determines if the reproduction process is under way in step S12.

When the reproduction process starts, the pickup 202 detects the audio signals recorded on the disc 201. The HF processor 203 then processes the detected audio signals, and outputs the processed HF signals to the first and second audio decoders 204-1 and 204-2. The controller 205 determines if the reproduction process is under way by judging whether the first and second audio decoders 204-1 and 204-2 are receiving processed audio signals from the HF processor 203 in step S12.

Based on the selections made by the users, the controller 205 instructs the first audio decoder 204-1 to extract and decode the audio signals for one of the selected channels or languages, and instructs the second audio decoder 204-2 to extract and decode the audio signals for another one of the selected channels or languages (steps S13 and S14). For example, the first audio decoder 204-1 extracts and decodes Audio 1 (English) or channel CH1, while the second audio decoder 204-2 extracts and decodes Audio 3 (Japanese) or channel CH3. If two or more channels (e.g., languages) are not being reproduced in step S11, if the reproduction process is not under way in step S12 or if the selected audio streams are not being extracted in step S13, processing ends.

Each of the first and second audio decoders 204-1 and 204-2 outputs audio signals for one of the channels or languages according to the selection made by a user. Therefore, multiple users can listen to audio output in the language of their choice.

While this embodiment has been described as including two audio decoders, this should not be taken as limiting the number of audio decoders to two. The number of audio decoders may be more than two. Further, although the above embodiment describes users selecting the desired channels or languages after the disc 201 is loaded, the embodiment can be easily modified so that the channels or languages for reproduction are preset before the reproduction process begins.

Each of the plurality of audio decoders in the above embodiment should preferably include a plurality of decoding function sections. Also, the reproducing apparatus can be easily applied to an apparatus for selecting and simultaneously outputting a plurality of desired sound channels such as discussed with respect to FIG. 6.

Figure 5:
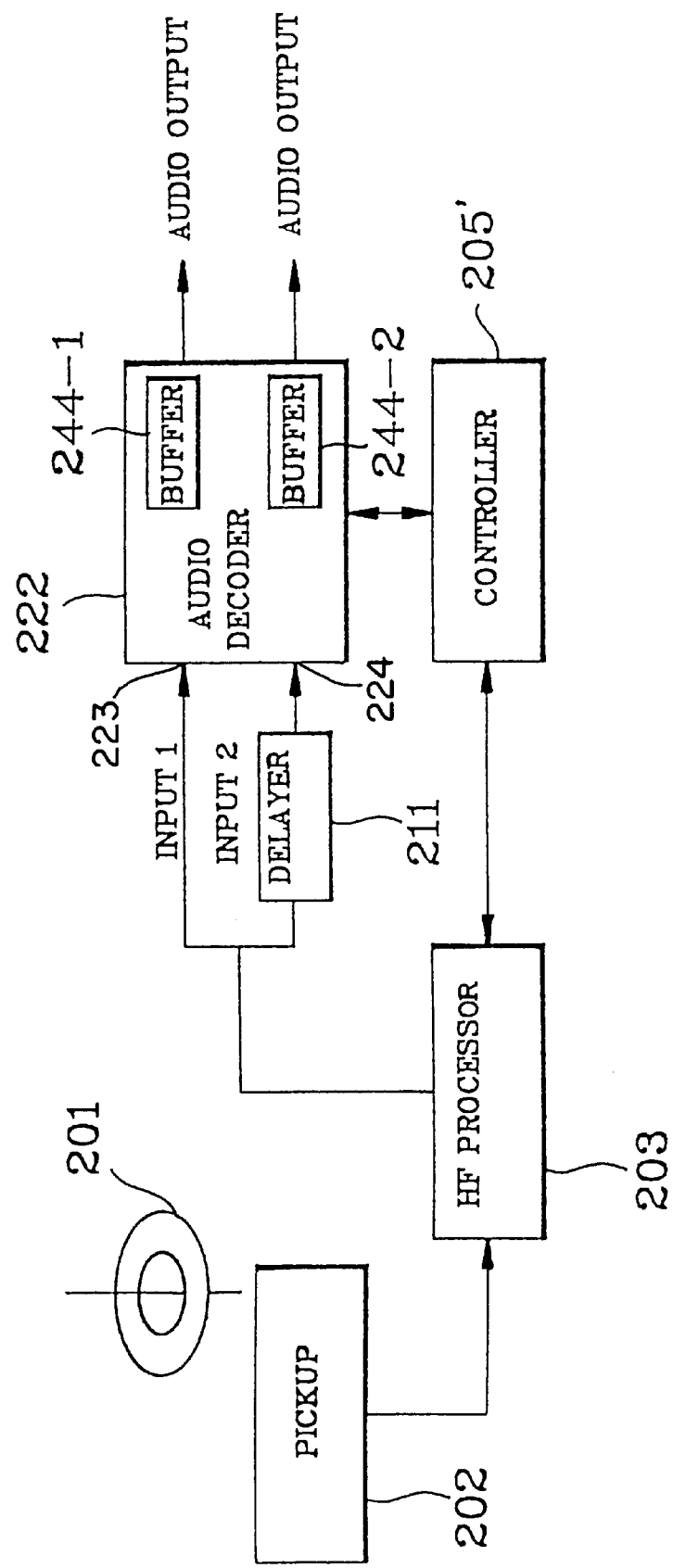
FIG. 5 is a block diagram illustrating an apparatus for reproducing audio signals from a DVD according to a second embodiment of the present invention.

Referring to FIG. 5, a reproducing apparatus reproducing audio signals for a plurality of channels or languages according to a second embodiment of the present invention will now be described. As shown in FIG. 5, the reproducing apparatus according to the second embodiment of the present invention includes a pickup 202 detecting audio signals for multiple audio channels or languages recorded on a disc 201, such as a DVD; a high frequency (HF) processor 203 processing the signals detected by the pickup and outputting the processed HF signals; an audio decoder 222 including first and second input terminals 223 and 224, which each receiving the output of the HF processor 203; a delayer 211 delaying the processed HF signals received by the second input 224; and a controller 205' setting channels or languages to be processed by the audio decoder 222 based on key or user inputs (not shown) and controlling the above operations of the HF processor 203 and the audio decoder 222.

The audio decoder 222 includes a first and second buffer 244-1 and 244-2. The first and second buffers 244-1 and 244-2 temporarily store the signals received at the first and second input terminals 223 and 224, respectively. The audio decoder 222 uses (1) the time difference between the audio signals received at the first and second input terminals 223 and 224 and (2) the first and second buffers 244-1 and 244-2 to extract, in time-division mode, audio signals for the corresponding channel or language selected by a user from the output signals of the HF processor 203. The audio decoder 222 decodes the extracted audio signals and outputs the decoded signals to corresponding audio outputs.

The reproducing apparatus according to the second embodiment shown in FIG. 5 operates in the same manner as the reproducing apparatus according to the first embodiment shown in FIG. 2, with the exception that the former uses the delayer 211 and an audio decoder 222 with first and second buffers 244-1 and 244-2 to extract and decode selected audio signals. Therefore, only the operation of elements which are different from the first embodiment will be explained with reference to FIG. 5 to avoid repetition.

Referring again to FIG. 5, the output signals of the HF processor 203 are input to the first and second input terminals 223 and 224 with a time difference caused by the delayer 211. The audio decoder 222 stores the signals received at the first and second input terminals 223 and 224 in the first and second buffers 244-1 and 244-2, respectively. Using a single internal decoder, the audio decoder 222, under the control of the controller 205', selectively decodes portions of the signals stored in the first and second buffers 244-1 and 244-2, and routes the decoded signals to a respective one of the audio outputs such that each audio output supplies a decoded audio signal for a selected one of the channels or languages. Thus, the second embodiment of the present invention shown in FIG. 5 can use the internal buffers of only one audio decoder, instead of a plurality of audio decoders to process, in a time-division mode to extract and decode the audio signals of the selected two or more channels or languages.

Figure 6:
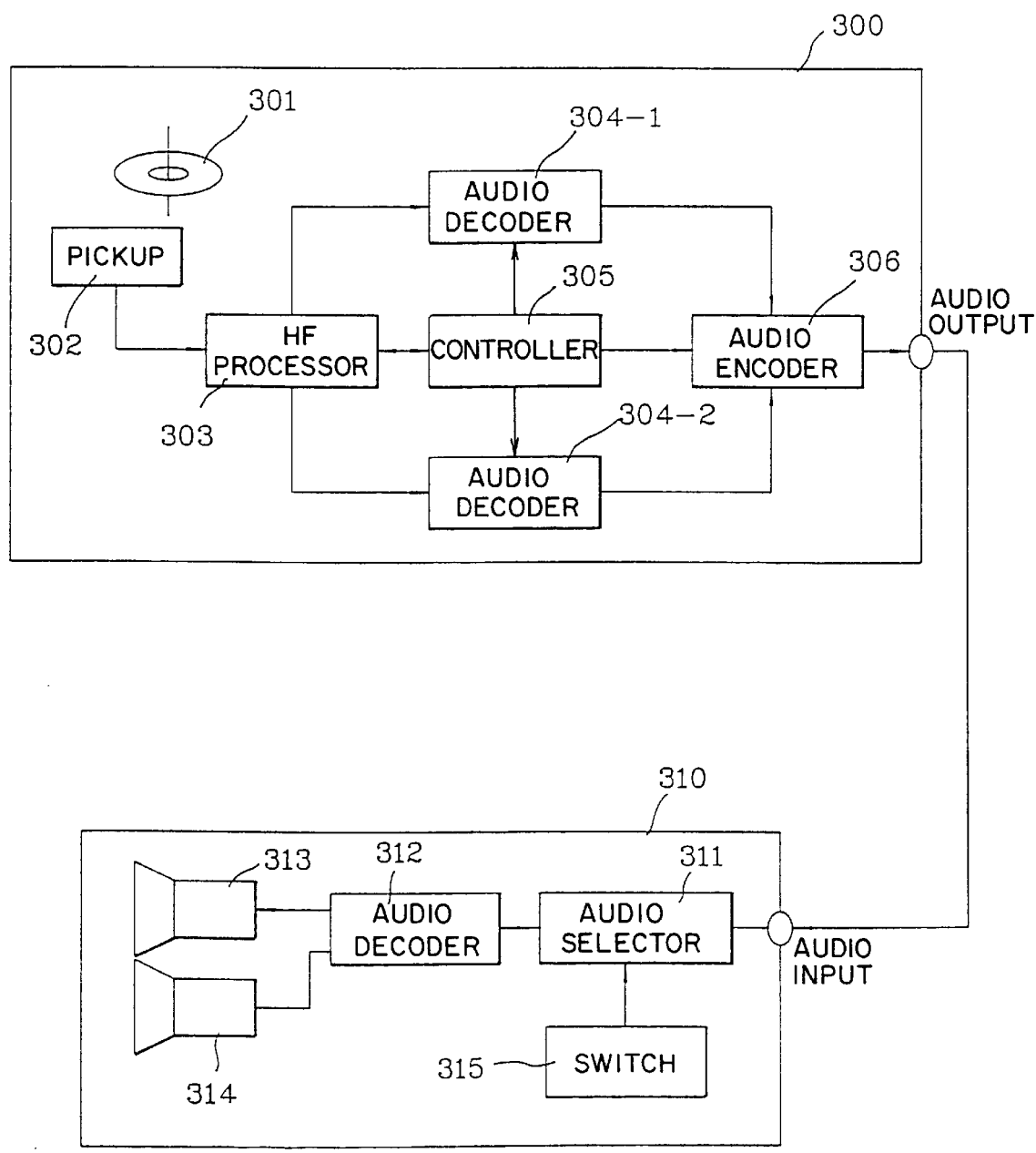
FIG. 6 is a block diagram illustrating an apparatus for reproducing audio signals from a DVD according to a third embodiment of the present invention and an apparatus for outputting the reproduced audio signals.

FIG. 6 illustrates a reproducing apparatus 300 according to a third embodiment of the present invention and an audio output apparatus 310 connected thereto.

As shown in FIG. 6, the reproducing apparatus 300 includes a pickup 302 detecting audio signals for multiple channels or languages recorded on a disc 301, such as a DVD; a high frequency (HF) processor 303 processing the audio signals detected by the pickup 302 and outputting the processed HF signals; first and second audio decoders 304-1 and 304-2 decoding the output signals of the HF processor 303; an audio encoder 306 mixing and encoding the output signals from the first and second audio decoders 304-1 and 304-2; and a controller 305 setting which channels or languages are to be processed by the first and second audio decoders 304-1 and 304-2 and controlling the operation of the HF processor 303, the first and second audio decoders 304-1 and 304-2, and the audio encoder 306.

The audio output apparatus 310 includes an audio selector 311 selectively outputting audio signals for a desired channel or language from among the mixed audio signals output by the audio encoder 306 based on input from a switch 315; and a third audio decoder 312 decoding the output signals of the audio selector 311, and outputting the decoded audio signals to speakers 313 and 314.

The operation of the reproducing apparatus according to the third embodiment will now be explained with respect to FIGS. 7 and 8. FIG. 8 illustrates a flow chart of the operation of the reproducing apparatus shown in FIG. 6. First, when the disc 301 is loaded, the pickup 302 detects guide information recorded in the header of the disc. Then the HF processor 303 processes the guide information, and transfers the processed information to the controller 305. The controller 305 determines in step S101 whether or not the transferred information relates to audio signals for multiple channels or languages.

If so, the controller 305 causes this information to be displayed on display devices (not shown), such as digitrons and on-screen displayers, as a selection menu of audio channels (e.g., Audio 1, Audio 2, Audio 3, . . . , Audio n). An example display of such a selection menu is shown in FIG. 7.

Next, users push selection keys to select one of the channels or languages from among the recorded multiple audio channels or languages shown in the selection menu of FIG. 7. The number of channels or languages which can be selected is limited to the number of audio decoders in the reproducing apparatus 300. The users then push the set key to set the selections made. Since two audio decoders, first and second audio decoders 304-1 and 304-2, are exemplified in the reproducing apparatus 300 of FIG. 6 according to the third embodiment, two reproduction routes for two channels or languages can be selected.

At step S111, the controller 305 receives the user input (not shown) and judges whether two or more channels or languages have been selected. If two or more channels (e.g., languages) have been selected, the controller 305 determines if the reproduction process is under way in step S121.

When the reproduction process starts, the pickup 302 detects the audio signals recorded on the disc 301. Then the HF processor 303 processes the detected audio signals, and outputs the processed HF signals to the first and second audio decoders 304-1 and 304-2.

The controller 305 determines if the reproduction process is under way by judging whether the first and second audio decoders 304-1 and 304-2 are receiving processed audio signals from the HF processor 303 in step S121.

Based on the selections made by the users, the controller 305 instructs the first audio decoder 304-1 to extract and decode the audio signals for one of the selected channels or languages, and instructs the second audio decoder 304-2 to extract and decode the audio signals for another one of the selected channels or languages (steps S131 and S141). For example, the first audio decoder 304-1 extracts and decodes Audio 1 or channel CH1, while the second audio decoder 304-2 extracts and decodes Audio 3 or channel CH3. If two or more languages are not being reproduced in step S111, if the reproduction process is not under way in step S121 or if the selected audio streams are not being extracted in step S131, processing ends.

Next, in step S151 the audio encoder 306 multiplexes the audio signals output by the first and second audio decoders 304-1 and 304-2, and outputs the multiplexed audio signals to the audio output apparatus 310. At the audio output apparatus 310, a user selects a channel or language he wants to hear via switch 315, and the audio selector 311 outputs the audio signals for the selected channel or language from the multiplexed audio signals. The third audio decoder 312 then decodes the selected audio signals, and outputs the decoded audio signals to the speakers 313 and 314. Accordingly, the user can hear the audio signals for a desired channel or language from among multiple channels or languages recorded on the disc.

In the above embodiment, if multiple audio output apparatuses 310 are connected to the reproducing apparatus 300, multiple users can simultaneously enjoy audio signals for multiple channels or languages recorded on the disc.

Except for the addition of the audio encoder 306, the reproducing apparatus 300 of FIG. 6 is the same as the reproducing apparatus of FIG. 2, and like modifications can be made. As a further modification of the third embodiment of the present invention. The structure corresponding to the reproducing apparatus of FIG. 2 can be replaced by the structure of the reproducing apparatus shown in FIG. 5. In this instance, the audio encoder 306 is connected to the audio outputs of the audio decoder 222. The number of channels or languages which can be decoded is then limited to the number of buffers in the audio decoder 222.

As described above, the present invention reproduces audio signals for multiple channels or languages recorded on a disc, such as a DVD, selects audio signals for desired channels or languages, and simultaneously outputs the selected audio signals; thereby giving a user or multiple users greater satisfaction and convenience.

As will be evident to those skilled in the art, various modifications of this invention can be made or followed in light of the foregoing disclosure without departing from the spirit of the disclosure or from the scope of the claims.

What is claimed:

1. A reproducing apparatus, comprising:

an audio signal processor receiving digital audio signals for multiple channels reproduced from a disc, and processing said received digital audio signals;

a controller setting channels of said multiple channels for reproduction, and generating control signals indicative thereof;

decoding means receiving said processed audio signals and said control signals, and extracting and decoding audio signals for said set channels included in said processed audio signals based on said control signals, and outputting said decoded audio signals for said set channels in parallel.

2. The reproducing apparatus of claim 1, wherein said digital audio signals for each of said multiple channels represent a different language.

3. The reproducing apparatus of claim 1, wherein
said audio signal processor extracts format information from said digital audio signals, said format information indicates what type of information corresponds to each channel of said multiple channels; and
said controller outputs said extracted format information for display.

4. The reproducing apparatus of claim 1, wherein said controller receives input from users requesting reproduction of different channels in said multiple channels, and said controller sets said user requested channels of said multiple channels for reproduction.

5. The reproducing apparatus of claim 1, further comprising:
a pick-up detecting said digital audio signals recorded on a disc; and wherein
said audio signal processor processes said detected digital audio signals.

6. The reproducing apparatus of claim 5, wherein said disc is a Digital Video Disc or a Digital Versatile Disc.

7. The reproducing apparatus of claim 1, wherein said audio signal processor is a high frequency audio signal processor and generates high frequency processed audio signals.

8. The reproducing apparatus of claim 1, wherein
said controller sets at least a first channel and a second channel of said multiple channels for reproduction, generates and outputs a first control signal instructing to decode said audio signals for said first channel included in said processed audio signals, and generates and outputs a second control signal instructing to decode audio signals for said second channel included in said processed audio signals; and
said decoding means includes at least a first and second decoder, said first decoder receives said processed audio signals and said first control signal, and extracts and decodes said audio signals for said first channel included in said processed audio signals based on said first control signal, said second decoder receives said processed audio signals and said second control signal, and extracts and decodes said audio signals for said second channel included in said processed audio signals based on said second control signal, and said first and second decoders simultaneously output said decoded first and second channels, respectively.

9. The reproducing apparatus of claim 8, further comprising:
a mixer combining and encoding output from said first and second decoder.

10. The reproducing apparatus of claim 9, further comprising:
at least one audio output unit, each audio output unit including,
a selector receiving output from said mixer and a selection input from a user, selectively extracting said output from one of said first and second decoder based on said selection input;
a third decoder decoding output of said selector; and
at least one speaker reproducing output of said third decoder.

11. The reproducing apparatus of claim 1, wherein
said controller sets at least a first channel and a second channel of said multiple channels for reproduction, generates and outputs a control signal instructing to decode said audio signals for said first channel included in said processed audio signals and to decode audio signals for said second channel included in said processed audio signals; and
said decoding means including at least one delayer and a first decoder, said delayer receives and delays said processed audio signals, said first decoder receives said processed audio signals, said delayed processed audio signals and said control signal, and time-divisionally extracts and decodes said audio signals for said first channel from said processed audio signals and said audio signals for said second channel from said delayed processed audio signals based on said control signal, and said first decoder simultaneously outputs said decoded audio signals for said first channel and said second channel.

12. The reproducing apparatus of claim 11, wherein said first decoder includes at least a first and second input, at least a first and second buffer, and at least a first and second output, said first input receiving said processed audio signals, said second input receiving said delayed processed audio signals, said first buffer storing said processed audio signals received by said first input, said second buffer storing said delayed processed audio signals received by said second input, said first decoder time-divisionally extracting and decoding said processed audio signals and said delayed processed audio signal from said first and second buffers such that decoded audio signals for said first channel are output at said first output and decoded audio signals for said second channel are output at said second output.

13. The reproducing apparatus of claim 11, further comprising:
a mixer combining and encoding outputs from said first decoder.

14. The reproducing apparatus of claim 13, further comprising:
at least one audio output unit, each audio output unit including,
a selector receiving output from said mixer and a selection input from a user, selectively extracting one of said outputs from said first decoder in said output from said mixer based on said selection input;
a second decoder decoding output of said selector; and
at least one speaker reproducing output of said second decoder.

15. A method of reproducing audio signals from a disc, comprising:
(a) receiving digital audio signals for multiple channels reproduced from a disc;
(b) processing said received digital audio signals;
(c) setting channels of said multiple channels for reproduction;
(d) extracting audio signals for said set channels from said processed audio signals;
(e) decoding said extracted audio signals for said set channels; and
(f) outputting said decoded audio signals for said set channels in parallel.

16. The method of claim 15, wherein said digital audio signals for each of said multiple channels represent a different language.

17. The method of claim 15, further comprising:
(g) extracting format information from said digital audio signals, said format information indicating what type of information corresponds to each channel of said multiple channels; and
(h) outputting said extracted format information for display.

18. The method of claim 15, further comprising:
(g) receiving input from users requesting reproduction of different channels in said multiple channels; and wherein
said step (c) sets said user requested channels of said multiple channels for reproduction.

19. The method of claim 15, further comprising:
(g) detecting said digital audio signals recorded on a disc; and wherein
said step (b) processes said detected digital audio signals.

20. The method of claim 19, wherein said disc is a Digital Video Disc or a Digital Versatile Disc.

21. The method of claim 15, wherein said step (b) high frequency processes said digital audio signals.

22. The method of claim 15, wherein
said step (c) sets at least a first and second channel for reproduction;
said step (d) simultaneously extracts audio signals for said first and second channels;
said step (e) simultaneously decodes said audio signals for said first and second channels, and
said step (f) outputs said decoded audio signals for said first and second channels in parallel.

23. The method of claim 22, further comprising:
(g) combining and encoding said decoded audio signals for said first and second channels output in said step (f).

24. The method of claim 23, further comprising:
(h) selectively extracting said decoded audio signals for one of said first and second channels from output of said step (g) based on user input;
(i) decoding output of said step (h); and
(j) reproducing output of said step (i) using at least one speaker.

25. The method of claim 15, further comprising:
(g) delaying said processed audio signals; and wherein
said steps (c) sets at least a first and second channel for reproduction;
said steps (d) and (e) time-divisionally extract and decode audio signals for said first and second channels from said processed audio signals and said delayed processed audio signals, respectively; and
said step (f) simultaneously outputs said decoded audio signals for said first and second channels.

26. The method of claim 25, wherein said step (c) comprises:
(c1) storing said processed audio signals in a first buffer; and
(c2) storing said delayed processed signals in a second buffer.

27. The method of claim 25, further comprising:
(h) combining and encoding said decoded audio signals for said first and second channels output in step (f).

28. The method of claim 27, further comprising:
(i) selectively extracting said decoded audio signals for one of said first and second channels from output of said step (h) based on user input;
(j) decoding output of said step (i); and
(k) reproducing output of said step (j) using at least one speaker.

29. The method of claim 15, further comprising:
(g) extracting format information from said digital audio signals, said format information indicating what type of information corresponds to each channel of said multiple channels;
(h) determining from said format information whether said disc stores audio signals for more than one channel; and
(i) performing steps (b)–(f) if said step (h) determines that said disc stores audio signals for more than one channel.

* * * * *